May 6, 1941.    O. WITTEL    2,241,231
FRICTION DRIVE FOR PHOTOGRAPHIC APPARATUS OF THE MAGAZINE TYPE
Filed July 7, 1938
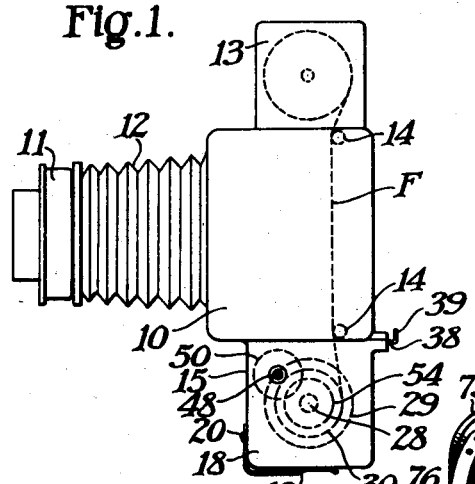
Otto Wittel
INVENTOR
BY Newton M. Perkins
George A. Gillette, Jr.
ATTORNEYS Patented May 6, 1941

2,241,231

UNITED STATES PATENT OFFICE 2,241,231

FRICTION DRIVE FOR PHOTOGRAPHIC APPARATUS OF THE MAGAZINE TYPE

Otto Wittel, Rochester, N. Y., assignor to Eastman Kodak Company, Rochester, N. Y., a corporation of New Jersey Application July 7, 1938, Serial No. 217,942

2 Claims. (Cl. 88—17)

The present invention relates to photographic apparatus of the magazine type and more particularly to a friction drive from the apparatus to the film magazine, which friction drive is engaged when said film magazine is inserted into the magazine chamber of the apparatus.

It is well known that the take-up drive of a photographic apparatus must include a friction or slip connection to compensate for the increase in diameter of the take-up roll. It is also well known to provide detachable clutch connections between the apparatus and a film magazine therefor. However, up to the present time such clutch connections and friction or slip connections have been separately provided thereby either increasing the complication of the drive mechanism for the take-up roll or rendering insertion of the film magazine more awkward.

The primary object of the present invention is the provision of a driving connection between a photographic apparatus and a film roll of a film magazine, said driving connection being of the friction type to permit slip as required by increase in diameter of the take-up roll and also being adapted to be engaged when the film magazine is inserted into the magazine chamber and to be disengaged when the film magazine is withdrawn from the magazine chamber.

Another object of the invention is the provision of a detachable driving connection between a driving member on the photographic apparatus and a support member on the film magazine, said driving connection comprising a pair of discs on one of said members and a single disc upon the other of said members.

A further object of the invention is the provision of a detachable friction driving connection including a pair of spring discs between which a single disc may be readily fitted for frictional and resilient engagement with said pair of discs.

Still another object of the invention is the provision of a film magazine having parallel side walls, one of which is provided with a recess, and a clutch member mounted upon the film magazine and including at least one disc which is within said recess but substantially flush with the unrecessed portion of the side wall of the casing.

Other and further objects of the invention will be apparent to those skilled in the art from the description which follows.

Reference is hereby made to the accompanying drawing wherein similar reference characters designate similar elements and wherein:

Fig. 1 is a side elevation of a photographic apparatus provided with a magazine chamber which is adapted to receive a take-up film magazine.

Fig. 2 is a fragmentary longitudinal section through the magazine chamber taken on the line 2—2 of Fig. 3 and also with a portion of the film magazine wall broken away for better illustration of the operating mechanisms.

Fig. 3 is a transverse section through the magazine chamber and film magazine taken on the line 3—3 of Fig. 2.

Fig. 4 is a rear perspective of a motion picture apparatus of the magazine type and of a film magazine just prior to insertion into the magazine chamber of the apparatus.

Fig. 5 is a top view of the motion picture apparatus of Fig. 4 with part of the apparatus wall and all of the magazine top wall being broken away to illustrate the preferred form of the friction drive connection of the invention.

The above and other objects of the invention are embodied in a photographic apparatus provided with a magazine chamber and comprising in combination a film magazine adapted to be inserted into and withdrawn from the magazine chamber and carrying a support member for a film roll, a driving member mounted for rotation on the photographic apparatus, and a driving connection between said support member and said driving member, said connection including a pair of discs on one if said members and a single disc on the other of said members and which is adapted, upon insertion of the film magazine into the magazine chamber, to fit frictionally between said pair of discs. More specifically, the driving connection of the invention is particularly adaptable to insertion into the magazine chamber by movement in a plane which is parallel to the optical axis of the apparatus or by movement along the optical axis itself.

In the illustrated embodiment of Figs. 1 to 3, inclusive, the photographic apparatus comprises a camera body 10, an objective assembly 11 and a foldable bellows 12 therebetween. A supply film magazine 13 may be mounted on top of camera body 10 and the film F conducted therefrom over rollers 14 into the magazine chamber 15 below the camera body 10.

More specifically, the magazine chamber 15 is encased at the top and front respectively by a wall 16 of the camera body 10, and a front wall 17, see Fig. 2, and at the sides, see Fig. 3, by side walls 18. A positioning spring 19 is secured to front wall 17 by bolt 20 and supports the film magazine, designated generally as 21, from the bottom. A spring latch 22 is rotatably mounted on said bottom wall 16 of camera body 10 and is provided with a hole (not shown) for engagement with the pin 23 on film magazine 21.

The film magazine 21 is a light-tight casing having a top wall 24, a bottom wall 25, front and rear side walls 26, and lateral side walls 27. A support member is rotatably mounted within film magazine 21 for carrying a film roll. Such a support member may be provided in any conventional manner or may be constructed as particularly illustrated in Fig. 3. As shown, the support member may comprise a spindle 28, a pair of spaced flanges 29 and a hub member 30. The spindle 28 is journaled at one end by a pin 31 extending from a boss 27' and at the other end within an opening of an opposite boss 27'. A spring member 32 is mounted on the inner surface of one lateral side wall 27 and bears upon one of flanges 29 of the film spool.

The top wall 24 of film magazine 21 is provided with a transverse opening 33 and a guide flange 34 is fastened to top wall 24 and extends through opening 33 to guide the film F into the film magazine. A shutter member 35 is slidably mounted on said top wall 24 and is provided with a transverse slot 36. A spring member 37 bears against one edge of shutter member 35 normally to close the same and move transverse slot 36 out of registration with transverse opening 33.

An operating member 38 is slidably mounted on the lower face of bottom wall 16 of camera body 10 and includes a finger portion 39, and a depending portion 40 extending downwardly for engagement with the front side wall 26 of the film magazine. A guide pin 41 is also mounted on bottom wall 16 and is located within a slot 42 in operating member 38 and a slot 43 in shutter member 35.

When the film magazine is held in the position shown in Fig. 2 by positioning spring 19 and spring latch 22, the top wall 24 and shutter member 35 of the magazine are imbedded or in contact with plush strips 44 and 45 to prevent light-leak between the camera body 10 and film magazine 21. With operating member 38 in the position shown, the transverse slot 46 therein registers with a transverse opening 47 in bottom wall 16. At the same time shutter member 35 engages guide pin 41 so that spring member 37 is compressed and the transverse slot 36 in said shutter member 35 is held in registry with the transverse opening 33 in top wall 24. Since all of the transverse openings are in alignment, the film F may be fed into the interior of film magazine 21 and wound upon the hub member 30 of the film spool.

Detachment of the film magazine and severance of the film F is accomplished by drawing operating member 38 forwardly by movement of finger portion 39 to sever the film and to move the film magazine forwardly by engagement of depending portion 40 with the front side wall 26 of the film magazine. Subsequently, spring latch 22 may be disengaged and the magazine removed from the magazine chamber. The structure and operation of the take-up film magazine as just described is also disclosed in my U. S. Patent 2,095,849, issued October 12, 1937, for a Camera magazine.

A rotatable driving member is mounted upon the apparatus and may be operated in any conventional manner as by a crank, electric motor, or spring motor. Such a driving member may comprise a shaft 48 journaled in a bearing 49 on one of the magazine chamber side walls 18 and driven by an electric motor (not shown). The shaft 48 extends into the interior of the magazine chamber and carries on such inner end one element of a friction slip driving connection. Such element may comprise a pair of discs 50 which preferably have flared peripheries 51 and which are preferably composed of resilient sheet material. Said pair of discs 50 may also be mounted in spaced relation by means of a washer 52 and a bolt 53 which is threaded into the end of shaft 48. As a result, the pair of flexible resilient discs 50 will be mounted in spaced relation on the end of the driving member or shaft 48, will be located within the magazine chamber and to one side thereof and will be rotated in planes which are parallel to the optical axis of objective assembly 11.

The other element of the friction driving connection may comprise a disc 54 which is fastened by a bolt 55 to the end of spindle 28 or, in other words, the single disc of the driving connection is mounted on the support member for the film roll. Said disc 54 is preferably provided with a beveled or sharp periphery 56, and preferably composed of fiber.

It will now be evident that when the film magazine 21 is inserted into its magazine chamber by movement in a plane parallel to the optical axis of optical assembly 11 that the disc 54 or its beveled periphery 56 will be inserted between the pair of discs 50 or their flared peripheries 51 for frictional surface engagement between said discs 50 and 54. When the diameter of the film roll on hub member 30 increases so that the take-up drive exceeds the rate of film movement through the camera, the relative slipping between discs 50 and 54 will compensate for the increased driving effort of the take-up. When the film run has been completed, it is merely necessary to withdraw the film magazine from the magazine chamber in the direction parallel to the optical axis of the apparatus and the driving connection between the driving member on the apparatus and support member in the film magazine will be simultaneously disengaged or disconnected.

The driving connection of the present invention is particularly suited for use between motion picture apparatus of the magazine type and film magazines therefore, such preferred application of the invention is illustrated in Figs. 4 and 5.

A typical motion picture apparatus comprises a casing 57 carrying an optical assembly 58 and having side walls 59 and 60 and a rear wall 61 provided with an opening 62 which may be closed by a hinged cover 63. A release mechanism 64 and a winding key 65, both of conventional design, are mounted upon side walls 60. The magazine chamber within casing 57 is enclosed at one side by side wall 59, at the front by a front plate 66, at the other side by a mechanism plate 67 and at the rear by the aforementioned hinged cover 63. The rotatable driving member on the apparatus comprises a shaft 68 which is driven by gearing or other conventional connections from a spring motor, not shown, but which may be wound by key 65. Shaft 68 is journaled in mechanism plate 67 and extends into the magazine chamber. This inner end of driving shaft 68 carries a pair of resilient discs 69 which are mounted in spaced relation thereon.

The film magazine 70 includes a casing having a side wall 71, a lateral wall 72 and a cover 73. The front portion of lateral wall 72 is provided with an exposure opening through which a frame 74 on front plate 66 extends. The film F is held by a conventional type pressure member 75 against the front lateral wall of the magazine or against the rear edge of frame 74 by the resilient action between the spring member 76 on the rear film magazine 70 and the hinged cover 63 when it is closed. The film supply roll 77 is mounted on a spindle 78 which is journaled between the side wall 71 and cover 73 of the film magazine casing. The take-up film roll 79 is wound upon a support member 80. The film may extend from supply roll 77 through the film gate formed between frame 74 and pressure pad 75 in any of the film paths well known to those skilled in the art. The manner of conducting the film through the magazine or of positioning the film at the gate for exposure has no bearing on the present invention.

The side wall 71 of the magazine casing is provided with a recess 81 or, in other words, the side wall 71 is provided with a depressed wall portion 82. Said recess 81 or depressed wall portion 82 has an open end adjacent the exposure opening in the front portion of lateral wall 72 and is large enough to receive both elements of the driving connection. The other element of the driving connection comprises a single disc 83 which is mounted on one end of support member 80 and is within recess 81, being substantially flush with the unrecessed portion of side wall 71. By so providing disc 83 within the recess 81 of film magazine 70 it is apparent that these magazines may be readily stacked, one upon the other, without any interference as would otherwise be occasioned with projecting clutch members.

As before, it is merely necessary to insert the film magazine 70 along the optical axis of objective assembly 58, which optical axis in this instance extends through the magazine chamber. The film magazine 70 is guided by the side springs 84 on the inner side of side wall 59 and just prior to final positioning of the magazine, the disc 83 enters frictionally between the resilient discs 69. In this manner a friction or slip type of driving connection is made simultaneously with insertion of the film magazine in a convenient manner and obviously such driving connection is simultaneously disconnected upon removal of the film magazine from the magazine chamber.

It will be apparent to those skilled in the art that the rate of drive for the take-up film roll may be controlled or varied by the amount of insertion of the disc 83 between the resilient discs 69 or by the amount of overlapping between said discs 83 and 69. It is also to be understood that the two elements of the driving connection according to the invention may be interchanged at will. In other words, it is obvious that the pair of resilient discs 69 and single disc 54, as shown in Fig. 3, may be reversed so that the single disc 54 is on the shaft 48 and the pair of discs 69 are on the spindle 28. Likewise, the pair of discs 69 and discs 83 may be interchanged so that the single disc 83 is on the shaft 68 and the pair of resilient discs 69 are on the support member 80 within the recess 81 and substantially flush with the undepressed portion of side wall 71. Other variations of the invention will be apparent to those skilled in the art but the scope of the invention is limited only by the appended claims.

Having now particularly described my invention what I desire to secure by Letters Patent of the United States and what I claim is:

1. In a photographic apparatus provided with a magazine chamber, the combination with an objective assembly mounted on said apparatus and having an optical axis, a film magazine adapted to be inserted into and removed from said chamber by movement in a plane parallel to said optical axis, a spindle member rotatably mounted in said film magazine and carrying a take-up film roll, and a take-up driving member rotatably mounted on said apparatus for rotation about an axis which is in a plane perpendicular to said optical axis, of a detachable and immediate driving connection between the take-up spindle member and said take-up driving member, including a pair of resilient disks mounted on one of said members, and a single rigid disk mounted on the other of said members, said disks being arranged so that said single disk is moved into frictional engagement between said pair of disks by insertion of the film magazine along a plane parallel to said optical axis into said magazine chamber.

2. In a photographic apparatus provided with a magazine chamber, the combination with an objective assembly mounted on said apparatus and having an optical axis, and a driving member mounted on said apparatus for rotation about an axis in a plane perpendicular to said optical axis, of a pair of flexible resilient disks mounted in spaced relation on the end of said driving member within said magazine chamber to one side thereof, rotating in planes parallel to said optical axis, and adapted to receive into frictional engagement between said pair of disks a single film driving disk which is on a film magazine and which is moved into such engagement by insertion of a film magazine into said magazine chamber.

OTTO WITTEL.